United States Patent
Shuler et al.

(10) Patent No.: US 10,623,521 B2
(45) Date of Patent: Apr. 14, 2020

(54) DISTRIBUTION OF MESSAGES TO QUEUES IN A DISTRIBUTED COMPUTING ENVIRONMENT

(71) Applicant: Mellanox Technologies Ltd., Yokneam (IL)

(72) Inventors: Shahaf Shuler, Kibbutz Lohamei Hagetaot (IL); Noam Bloch, Bat Shlomo (IL); Yossef Itigin, Ashdod (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 367 days.

(21) Appl. No.: 15/390,558

(22) Filed: Dec. 26, 2016

(65) Prior Publication Data

US 2018/0183895 A1 Jun. 28, 2018

(51) Int. Cl.
*H04L 29/08* (2006.01)
*G06F 9/54* (2006.01)

(52) U.S. Cl.
CPC .............. *H04L 67/32* (2013.01); *G06F 9/546* (2013.01); *G06F 2209/548* (2013.01)

(58) Field of Classification Search
None
See application file for complete search history.

(56) References Cited

U.S. PATENT DOCUMENTS

| 7,549,151 | B2 | 6/2009 | Zhou et al. | |
|---|---|---|---|---|
| 9,286,145 | B2 | 3/2016 | Archer et al. | |
| 2008/0181245 | A1* | 7/2008 | Basso | H04L 47/50 370/412 |
| 2009/0006521 | A1* | 1/2009 | Veal | H04L 45/00 709/201 |
| 2013/0173895 | A1* | 7/2013 | Li | G06F 13/24 712/244 |
| 2017/0093792 | A1* | 3/2017 | Marom | H04L 67/42 |

OTHER PUBLICATIONS

MPI: A Message-Passing Interface Standard, Message Passing Interface Forum, version 3.1, 868 pages, Jun. 4, 2015.
OpenMP Application Programming Interface, version 4.5, 368 pages, Nov. 2015.
Herbert et al., "Scaling in the Linux Networking Stack", 7 pages, Dec. 19, 2016 (downloaded from https://www.kernel.org/doc/Documentation/networking/scaling.txt).
Wu et al., "Why Does Flow Director Cause Packet Reordering?", IEEE Communication Letters, vol. 15, issue 2, pp. 253-255, year 2011.

\* cited by examiner

*Primary Examiner* — Philip J Chea
*Assistant Examiner* — Hassan A Khan
(74) *Attorney, Agent, or Firm* — Kligler & Associates Patent Attorneys Ltd

(57) ABSTRACT

A network adapter includes a network interface and circuitry. The network interface is assigned a single network address in a communication network, and is configured to receive, from one or more other nodes over the communication network, messages that are destined for processing by multiple threads in one or more processing cores of a network node including the network adapter, but are nevertheless addressed to the single network address. The circuitry is configured to hold a distribution rule for distributing the messages among multiple Receive Queues (RQs) that are accessible by the threads, and to select for each message received via the network interface a respective RQ, by applying the distribution rule to the message.

18 Claims, 3 Drawing Sheets

DISTRIBUTION OF MESSAGES TO QUEUES IN A DISTRIBUTED COMPUTING ENVIRONMENT

TECHNICAL FIELD

Embodiments described herein relate generally to distributed computing, and particularly to methods and systems for distributing messages to queues in executing distributed applications.

BACKGROUND

In distributed computing, an application program is typically broken into multiple subprograms, which are executed by multiple processors that may belong to different computer hosts. To coordinate such distributed execution, the computer hosts typically exchange messages with one another over a communication network.

Methods for executing distributed application programs are known in the art. For example, U.S. Pat. No. 7,549,151, whose disclosure is incorporated herein by reference, describes an asynchronous message passing mechanism that allows for multiple messages to be batched for delivery between processes, while allowing for full memory protection during data transfers and a lockless mechanism for speeding up queue operation and queuing and delivering messages simultaneously.

U.S. Pat. No. 9,286,145, whose disclosure is incorporated herein by reference, describes processing data communications events in a parallel active messaging interface (denoted "PAMI") of a parallel computer that includes compute nodes that execute a parallel application, with the PAMI including data communications endpoints, and the endpoints are coupled for data communications through the PAMI and through other data communications resources, including determining by an advance function that there are no actionable data communications events pending for its context, placing by the advance function its thread of execution into a wait state, waiting for a subsequent data communications event for the context; responsive to occurrence of a subsequent data communications event for the context, awakening by the thread from the wait state, and processing by the advance function the subsequent data communications event now pending for the context.

Techniques for distributing messages received over a communication network among multiple queues are known in the art. For example, Receive Side Scaling (RSS) is a technology that enables hash-based distribution of messages received over an Ethernet network among multiple CPUs in a multiprocessor system. RSS is specified, for example, by Tom Herbert et al., in a document entitled "Scaling in the Linux Networking Stack," which is incorporated herein by reference.

SUMMARY

An embodiment that is described herein provides a network adapter that includes a network interface and circuitry. The network interface is assigned a single network address in a communication network, and is configured to receive, from one or more other nodes over the communication network, messages that are destined for processing by multiple threads in one or more processing cores of a network node including the network adapter, but are nevertheless addressed to the single network address. The circuitry is configured to hold a distribution rule for distributing the messages among multiple Receive Queues (RQs) that are accessible by the threads, and to select for each message received via the network interface a respective RQ, by applying the distribution rule to the message.

In some embodiments, the network interface is configured to receive the messages for performing at least a portion of a distributed application program using the threads. In other embodiments, the threads are assigned to handle messages of respective RQs in accordance with a predefined threads-to-RQ mapping, and the circuitry is configured to select a RQ for a given message independently of the threads-to-RQ mapping. In yet other embodiments, each thread is assigned a single respective RQ, and the circuitry is configured to notify a given thread of a message added to the respective RQ.

In an embodiment, the circuitry is configured to select a RQ for a given message based on a message source identifier in a header of the message. In another embodiment, the circuitry is configured to select a given RQ based on an occupancy status of multiple RQs including the given RQ. In yet another embodiment, the circuitry is configured to select a RQ for a given message depending on previous messages received via the network interface.

In some embodiments, the RQs reside in a memory external to the network adapter, and the circuitry is configured to manage the RQs logically by receiving from the cores a notification of the RQs allocated in the memory. In other embodiments, the circuitry is configured to apply the distribution rule to multiple received messages for dynamically balancing a work load among the RQs.

There is additionally provided, in accordance with an embodiment that is described herein, a method including, in a network adapter, which includes a network interface that is assigned a single network address in a communication network, receiving messages from one or more other nodes over the communication network, the messages are destined for processing by multiple threads in one or more processing cores of the network node but are nevertheless addressed to the single network address. A distribution rule is held for distributing the messages among multiple Receive Queues (RQs) that are accessible by the threads. For each message received via the network interface a respective RQ is selected, by applying the distribution rule to the message.

There is additionally provided, in accordance with an embodiment that is described herein, a network node that includes one or more processing core and a network adapter. The one or more processing cores are configured to execute multiple threads. The network adapter is configured to connect to a communication network via a network interface that is assigned a single network address in the communication network, to receive from one or more other nodes over the communication network, via the network interface, messages that are destined for processing by the multiple threads, but are nevertheless addressed to the single network address, to hold a distribution rule for distributing the messages among multiple Receive Queues (RQs) that are accessible by the threads, and to select for each message received via the network interface a respective RQ, by applying the distribution rule to the message.

There is additionally provided, in accordance with an embodiment that is described herein, a computing system that includes multiple network nodes connected to a communication network, each network node including one or more processing cores for executing multiple threads. The network nodes are configured to exchange messages with one another over the communication network for performing a distributed application, and in a given network node, to receive from one or more other nodes over the communication network, via a network interface for which a single network address is assigned in the communication network, messages that are destined for processing by multiple threads of the given network node, but are nevertheless addressed to the single network address, to hold a distribution rule for distributing the messages among Receive Queues (RQs) that are accessible by the threads of the given network node, to select for each message received via the network interface of the given network node, a respective RQ, by applying the distribution rule to the message, and to perform at least a portion of the distributed application using the threads.

These and other embodiments will be more fully understood from the following detailed description of the embodiments thereof, taken together with the drawings in which:

DETAILED DESCRIPTION OF EMBODIMENTS

Overview

Figure 1:
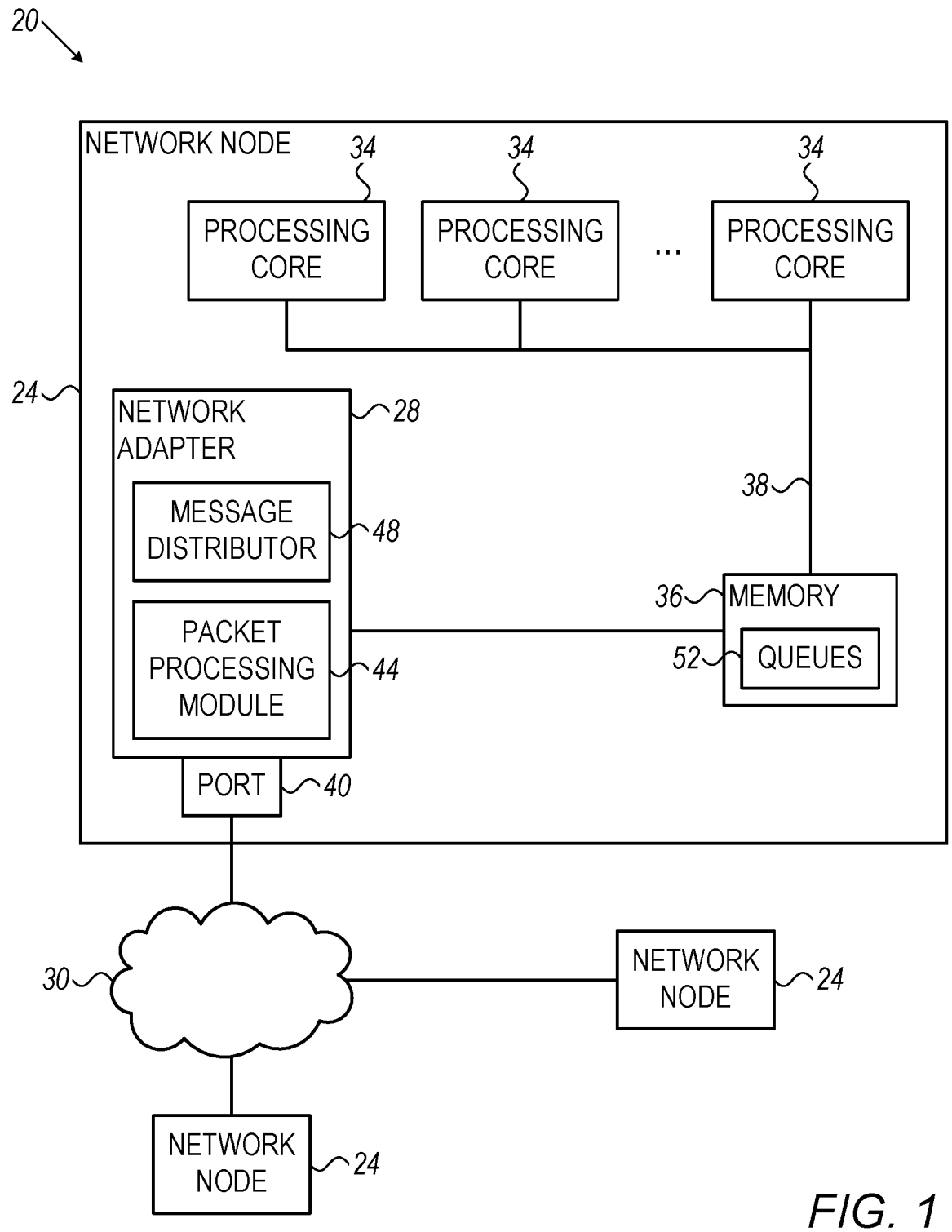
FIG. 1 is a block diagram that schematically illustrates a distributed computing system, in accordance with an embodiment that is described herein.

In distributed or parallel computing, the execution of an application program is distributed among multiple processes or threads, running on the same computer host or on different computer hosts. Distributed computing is applicable, for example, in High-Performance Computing (HPC) systems.

Distributed programming can be modeled in various ways. For example, in a communication protocol referred to as the Message Passing Interface (MPI), processes running on different hosts exchange messages with one another over a communication network. MPI is specified, for example, by the Message Passing Interface Forum in "MPI: A Message-Passing Interface Standard," version 3.1, Jun. 4, 2015, which is incorporated herein by reference.

A hybrid-MPI model that employs both the MPI and an application programming interface known as the Open Multi-Processing (OpenMP), extends the MPI to using threads. In the hybrid-MPI model, processes in different hosts communicate with one another over the communication network, and each process typically splits work among multiple threads that may share local memory. OpenMP is specified, for example, in "OpenMP Application Programming Interface," version 4.5, November, 2015, which is incorporated herein by reference.

In yet another model, known as a task-based scheduling model, the application program is written as a collection of tasks with interdependencies. When executing the application program, the runtime system spawns threads as required, and schedules their execution in accordance with the tasks interdependencies.

In some computing environments, multiple host computers communicate certain messages with one another asynchronously to coordinate the distributed execution. Since messages arrive at the receiving host at unknown scheduling, the messages are typically buffered prior to execution.

Consider, for example, a hybrid-MPI-based system in which a certain receiving host runs multiple threads, e.g., in order to handle the bandwidth of the incoming messages. In principle, the receiving host may hold a global queue for buffering all the incoming messages, and schedule the threads to handle the buffered messages sequentially. This approach, however, typically results in long processing periods of the buffered messages, e.g., in performing MPI tag matching. Moreover, since multiple threads attempt accessing a shared queue, this approach suffers from considerable locking overhead.

Alternatively, the receiving host can allocate a dedicated queue for each thread, wherein each queue is assigned a different network address for receiving messages from the communication network. The main disadvantages of this approach are 1) each of the receiving queues requires its own transport context, which requires a high memory footprint, and 2) remote hosts need to manage multiple network addresses for sending messages to the receiving host, which is unnecessarily complex, e.g., due to overhead caused by remote address lookup.

In some implementations, e.g., when using the task-based scheduling model, a thread that is less busy than others may move messages from the queue of an overloaded thread to its own queue. This "work-stealing" method, however, typically suffers from locking overhead caused by a thread accessing the queue of another thread.

Embodiments of the present invention that are described herein provide improved methods and systems for distributing incoming messages among queues with load balancing. In the disclosed embodiments, a compute node (also referred to herein as a network node) in a distributed computing system comprises a network adapter that receives messages from other nodes over a communication network. The network adapter comprises a network interface or port, which is assigned a single network address in the communication network. The port functions as an endpoint for transport layer communications. The received messages are destined for processing by multiple threads in one or more processing cores of the network node, but are nevertheless addressed to the single network address. The network node holds a distribution rule for distributing the received messages among multiple Receive Queues (RQs) that are accessible by the threads. The network node selects for each message received a respective RQ by applying the distribution rule to the message.

In some embodiments, the network node is part of a distributed computing system, and the messages received are used for performing at least a portion of a distributed application program using the threads.

Selecting the RQ for a received message can be carried out in various ways. For example, the selection may be based on the source process that has sent the message, on the RQs occupancy status, or on previously received messages and their respective selection.

In the disclosed techniques, each thread processes messages from a respective dedicated queue, and therefore no locking operations are needed. Since all the messages destined to be processed by the threads are addressed to a single common network address, communicating the messages is simplified and requires only little memory space for the transport context. In addition, the distribution rule can be defined for achieving a desired goal, such as load balancing among the queues.

System Description

FIG. 1 is a block diagram that schematically illustrates a distributed computing system 20, in accordance with an embodiment that is described herein. System 20 comprises multiple host computers 24, which communicate with one another over a network 30 and thus function as network nodes of the network. For example, the network nodes may communicate messages with one another for executing a distributed application program. In the description that follows, host computers 24 are interchangeably referred to as "compute nodes" or "network nodes."

Although in the example of FIG. 1, the distributed computing system comprises three network nodes 24, a practical distributed system may comprise any suitable number of network nodes. For example, a distributed system may comprise between a few hundreds to a few tens of thousands of compute nodes. The internal node structure is shown in the figure only for one of the network nodes, for the sake of clarity. The other network nodes typically have a similar structure.

Network 30 may comprise any suitable communication network such as, for example, an InfiniBand (IB) switch fabric, or packet networks of other sorts, such as Ethernet or Internet Protocol (IP) networks, that are configured for transport-layer transaction support. Alternatively, network 30 may operate in accordance with any other suitable standard or protocol.

In the present example, network nodes 24 connect to network 30 via respective network adapters 28, also referred to as Network Interface Controllers (NICs). Network node 24 comprises multiple hardware-implemented processing cores 34 that connect to a memory 36 via an internal bus 38. Alternatively, a network node with a single processing core can also be used. Each processing core typically runs independently, and may execute one or more processes using time sharing techniques. In addition, a process running on a given core may execute multiple concurrent threads. A typical compute node may comprise a few tens of cores, e.g., 40 cores per node, and each core runs multiple threads, e.g., four or even up to fourteen threads in parallel.

Memory 36 may comprise any suitable memory such as a Random Access Memory (RAM) or a Dynamic RAM (DRAM) of any suitable technology. The bus over which the cores access memory 36 may comprise any suitable bus or link. In general, cores 34 access memory 36 via a dedicated interface, in accordance with the underlying architecture. A PCIe bus may be used for accessing peripheral devices such as network interface cards. In some embodiments, memory 36 is a byte-addressable memory such as a DRAM.

Network adapter 28 comprises a port 40 for exchanging packets with other nodes over communication network 30. Port 40 serves as a network interface for the network adapter and in the present context the terms "port" and "network interface" are used interchangeably. In the context of the present application and in the claims, the term "port" means an endpoint for transport layer communications. In some embodiments, port 40 is assigned a single unique network address in network 30 for receiving messages and packets. In some embodiments, the unique address comprises a unique address triple comprising three addresses in layer-2, layer-3 and layer-4, respectively. As such, all messages destined for processing by cores 34 (e.g., using processes and/or threads) are addressed to the single network address assigned to port 40. In alternative embodiments, the network adapter comprises multiple ports such as port 40 (not shown in the figure) that are assigned respective unique network addresses. In such embodiments, processing cores 34 are divided into multiple disjoint groups of one or more cores per group, with each group of cores 34 associated with a respective port 40. Messages addressed to the single address of a given port are destined to the processes/threads executed by the respective group of cores associated with that port. In yet other embodiments, a single thread may be assigned to two or more ports for supporting a high bandwidth.

Network adapter 28 further comprises a packet processing module 44 and a message distributor 48. Packet processing module 44 applies to incoming packets various ingress processing tasks, such as verifying the integrity of the data in the packet, packet classification and prioritization. Packet processing module 44 typically checks certain fields in the packets headers for these purposes. The header fields comprise, for example, addressing information, such as source and destination addresses and port numbers, and the underlying network protocol used.

A message addressed to port 40 may comprise one or more packets, sent by another node over network 30. Message distributer 48 receives packets that were validated by packet processing module 44, and classifies the packets to their respective messages. Distributor 48 selects for each message (i.e., for the packets conveying the message) a respective queue in a pool of queues 52 in memory 36. The queues are accessible by the threads run by processing cores 34. Methods for distributing the incoming messages among the queues are described in detail below.

The distributed computing system and network node configurations shown in FIG. 1 are example configurations, which are chosen purely for the sake of conceptual clarity. In alternative embodiments, any other suitable distributed computing system and/or network node configurations can also be used. For example, although the embodiments described herein refer mainly to a network of one type, the disclosed techniques can be implemented in a multi-type network of which different parts of the network may operate in accordance with different protocols.

Certain elements of network node 24, network adapter 28, or both, may be implemented using hardware/firmware, such as using one or more Application-Specific Integrated Circuits (ASICs) or Field-Programmable Gate Arrays (FPGAs). Alternatively, some network node elements and/or network adapter elements may be implemented in software or using a combination of hardware/firmware and software elements.

In the example configuration shown in FIG. 1, each of cores 34 and memory 36 are implemented as separate Integrated Circuits (ICs). In alternative embodiments, however, some or all of cores 34 may be integrated on separate semiconductor dies in a single Multi-Chip Package (MCP) or System on Chip (SoC), and may be interconnected by an internal bus. Further alternatively, some or all of the cores may reside on the same die on which the memory is disposed.

In some embodiments, certain network node functions, such as certain functions of network adapter 28 and/or of cores 34, may be implemented using a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

As noted above, network adapter 28 comprises one or more ports 40 and other elements. In the description that follows and in the claims, the term "circuitry" refers to all the elements of the network adapter excluding the port or ports 40. In the example of FIG. 1, the circuitry comprises packet processing module 44, and message distributor 48.

Methods for Distributing Messages Among Queues

Figure 2:
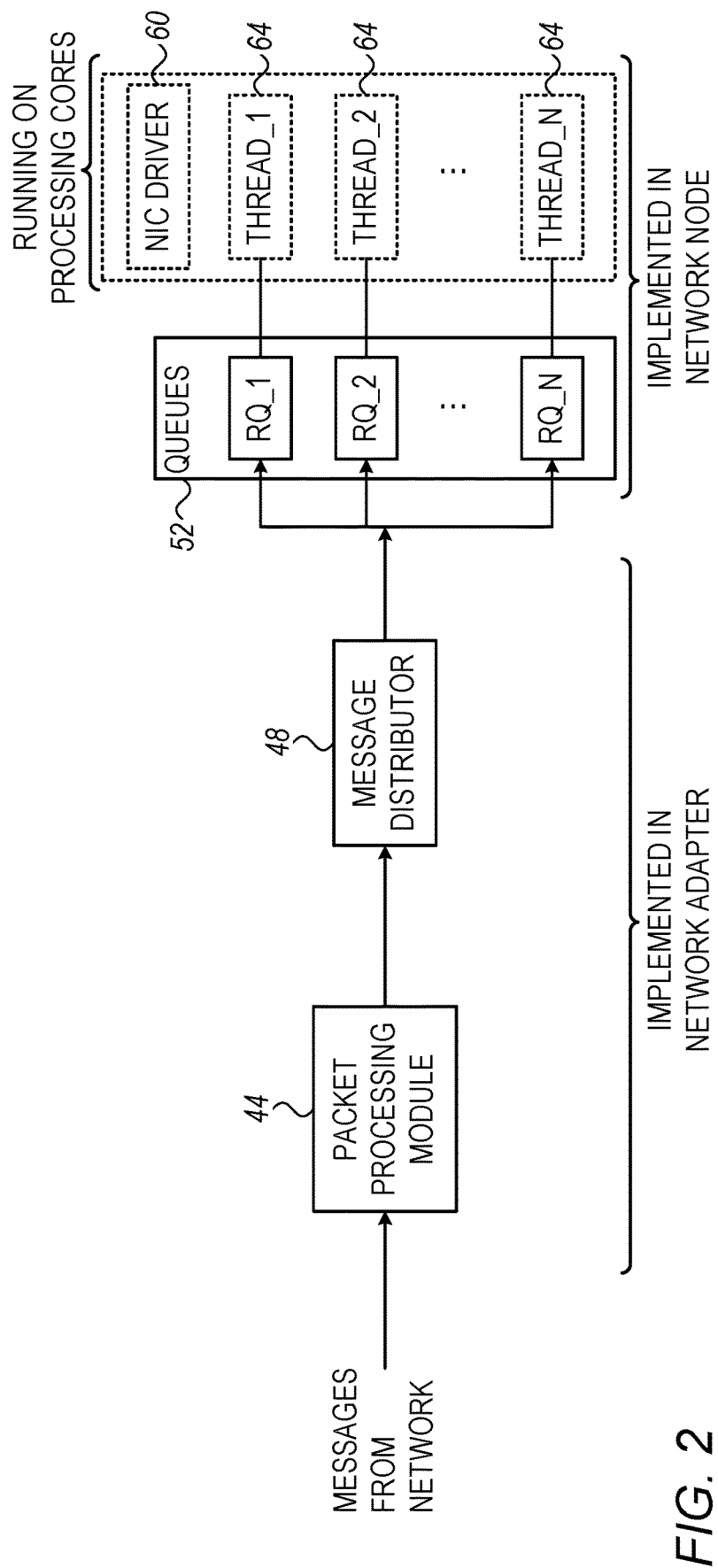
FIG. 2 is a diagram that schematically illustrates a processing flow in a network node for distributing messages among queues that are handled by multiple threads, in accordance with an embodiment that is described herein.

FIG. 2 is a diagram that schematically illustrates a processing flow in a network node for distributing messages among queues that are handled by multiple threads, in accordance with an embodiment that is described herein.

In describing FIG. 2, we assume that a host such as network node 24 receives messages from other nodes over communication network 30, wherein the messages are addressed to port 40 of network adapter 28, which port functions as a transport endpoint. In addition, we assume that cores 34 execute multiple threads 64, denoted THREAD_1 . . . THREAD_N, for processing the received messages. In the present example, each thread is associated with a respective Receive Queue (RQ) for messages denoted RQ_1 . . . RQ_N, which are allocated in que-pool 52 of memory 36.

Each packet received via port 40 is validated by packet processing module 34, as described above, and forwarded to message distributor 48, which distributes these packets among queues RQ_1 . . . RQ_N, in accordance with some predefined distribution rule. In an example embodiment, message distributor 48 applies the distribution rule to multiple received messages for dynamically distributing the work load among the queues. Additional example distribution rules are described further below.

In some embodiments, instead of storing the received messages in the RQs, each RQ holds a RQ entry per message, which points to the actual location in memory 36 in which the message is stored.

In some embodiments, cores 34 execute a NIC driver 60, which mediates between the operating system running on the network node and the network adapter. The NIC driver typically comprises a software layer that translates application network commands into hardware transactions. For example, the NIC driver posts messages to be sent via the device and passes respective completion messages to an upper layer of the software. The NIC driver is used, for example, for configuring the network adapter and for monitoring its operation by the operating system. For example, the operating system reports to the network adapter, using the NIC driver, the availability of the RQ_1 . . . RQ_N. In some embodiments, the NIC driver is involved in message processing and distribution, for example, using the operating system's TCP/IP stack on top of the NIC.

The dedicated queues RQ_1 . . . RQ_N in FIG. 2 are relatively short (e.g., compared to a conventional global queue) and therefore processing the queued messages, such as performing MPI tag-matching, can be carried out efficiently.

Figure 3:
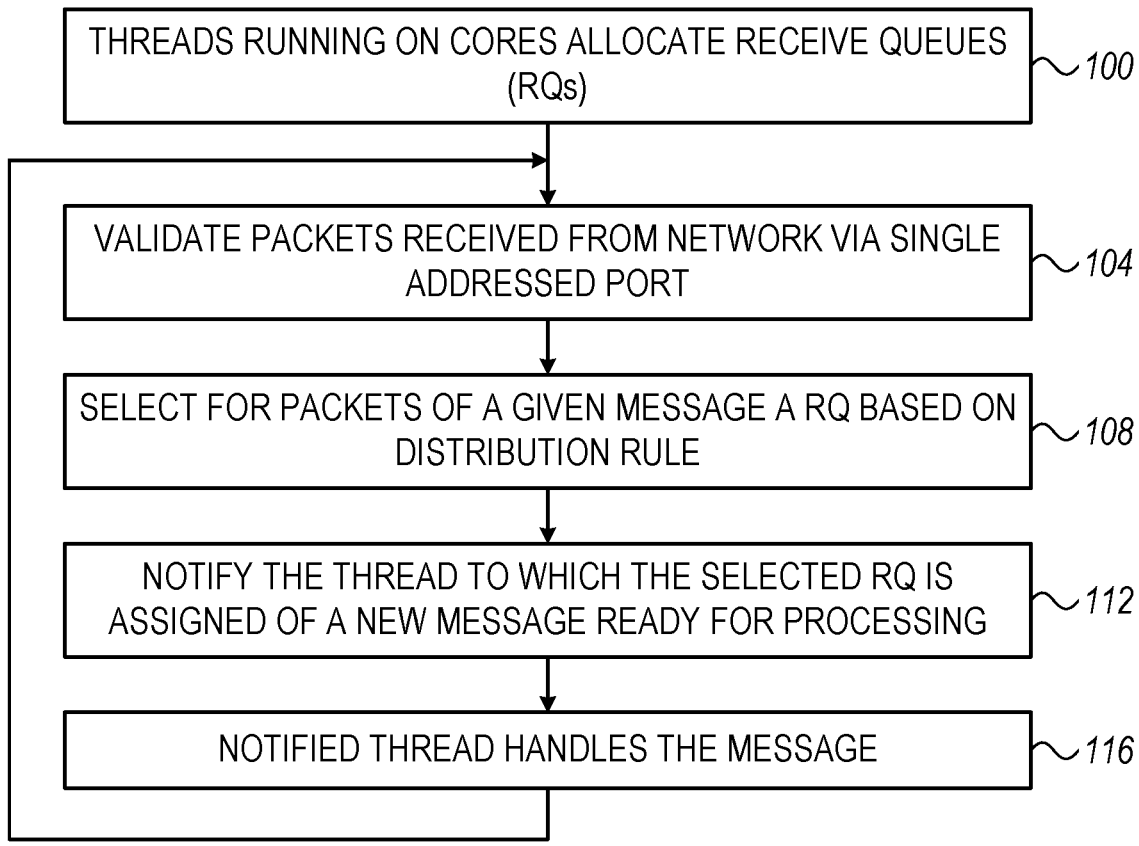
FIG. 3 is a flow chart that schematically illustrates a method for distributing messages among queues for processing by threads, in accordance with an embodiment that is described herein.

FIG. 3 is a flow chart that schematically illustrates a method for distributing messages among queues for processing by threads, in accordance with an embodiment that is described herein.

The method begins with cores 34 allocating RQs for the threads the cores run, at a queues allocation step 100. In some embodiments, for each thread the cores allocate a single respective RQ. Such allocation avoids locking overhead caused by arbitrating among multiple threads accessing the same queue. Alternatively, in an embodiment, a single RQ may be assigned to multiple threads.

Cores 34 typically notify message distributor 48 in network adapter 28 of the allocated RQs in memory 36, which is external to the network adapter. Although the RQs physically reside in memory 36, logically the RQs are part of network adapter 28 and are managed by message distributor 48. Note that although the cores assign or map the threads to handle respective RQs, e.g., using a predefined mapping or scheme, message distributor 48 is typically unaware of this mapping between the threads and the RQs and selects RQs for the incoming messages independently of this threads-to-RQ mapping.

At a packet reception step 104, packet processing module receives one or more packets from the network via port 40 (which is assigned a single network address in network 30) and validates the received packets as described above.

At a queue selection step 108, distributor 48 selects for the validated packets that belong to a common message a RQ among the RQs that were allocated at step 100. Distributor 48 can select the RQ in various ways. For example, in some embodiments, each process that sends messages to other processes over network 30 for the distributed execution is assigned a unique process identifier, also referred to as a "rank" or "Processing Element" (PE). In such embodiments, the received message comprises a header field whose value holds the identifier of the process on the remote node that has sent the message. In this case, each RQ is selected for storing messages received from one or more processes having predefined identifiers. In other words, this distribution rule maps one or more processes (by their respective identifiers) to each of the RQs. (This process-to-RQ mapping is not to be confused with the threads-to-RQ mapping determined by the cores, as described above.) To apply this rule, distributor 48 extracts the process identifier from the message header, and selects the respective RQ based on the process-to-RQ mapping.

As another example, the distribution rule dynamically balances the work load among the queues (or threads), e.g., by selecting for each message a RQ that is the least occupied among the available RQs. In this embodiment, distributor 48 queries the occupancy state of the RQs, and selects the RQ having the minimal number of pending RQEs. Alternatively, distributor 48 selects the RQ having the largest number of pre-posted RQ entries. Note that this distribution rule is independent of the message headers content.

As yet another example, the distribution rule can be based on dynamic information regarding previously received messages. For example, distributor 48 keeps track of the number of messages sent to each of the RQs, and selects for the current message a RQ that was selected for the minimal number of messages among the RQs.

As another example of a dynamic rule, the rule may select an RQ randomly among the RQs, e.g., with equal probabilities, or in accordance with other suitable statistical distributions.

At a notification step 112, the network adapter notifies the thread associated with the RQ selected at step 108 that a new message was added to the RQ and is pending to be processed. The notification can be implemented, e.g., by writing a completion message, triggering an interrupt routine, or using any other suitable notification method. In alternative embodiment, the threads repeatedly poll their respective RQs for new messages.

At a message processing step 116, the thread that was notified processes the message, and the method loops back to step 104 to receive subsequent packets.

The embodiments described above are given by way of example, and other suitable embodiments can also be used. For example, although the embodiments described above refer mainly to distributed execution by threads, as in the hybrid-MPI and task-based scheduling models, the disclosed techniques are similarly applicable to distributed execution by processes, as in MPI.

The disclosed techniques are applicable in various applications, such as, for example, in distributed computing that employs Remote Procedure Call (RPC) for servicing requests using multiple threads. In the RPC framework, an RPC server receives requests from multiple clients and spawns working threads for executing the work. Load balancing in RPC is essential for maximizing the performance of the system.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network adapter, comprising:
a network interface, which is assigned a single network address in a communication network, and which is configured to receive, from one or more other nodes over the communication network, messages that are destined for processing by multiple threads in one or more processing cores of a network node comprising the network adapter, but are nevertheless addressed to the single network address, wherein each message comprises a header field comprising an identifier of a process running on a remote node that sent the message; and
circuitry, which is configured to:
hold a distribution rule for distributing the messages among multiple Receive Queues (RQs) that are accessible by the threads, wherein the distribution rule specifies a process-to-RQ mapping that maps one or more processes running on one or more remote nodes, by their respective identifiers, to each of the RQs;
receive a multi-packet message via the network interface;
extract from the header field of the received message a respective process identifier; and
select for the packets of the received message a respective RQ by mapping the extracted process identifier to the respective RQ using the process-to-RQ mapping.

2. The network adapter according to claim 1, wherein the network interface is configured to receive the messages for performing at least a portion of a distributed application program using the threads.

3. The network adapter according to claim 1, wherein the threads are assigned to handle messages of respective RQs in accordance with a predefined threads-to-RQ mapping, and wherein the circuitry is configured to select a RQ for a given message independently of the threads-to-RQ mapping.

4. The network adapter according to claim 1, wherein each thread is assigned a single respective RQ, and wherein the circuitry is configured to notify a given thread of a message added to the respective RQ.

5. The network adapter according to claim 1, wherein the circuitry is configured to select a given RQ based on an occupancy status of multiple RQs including the given RQ.

6. The network adapter according to claim 1, wherein the circuitry is configured to select a RQ for a given message depending on previous messages received via the network interface.

7. The network adapter according to claim 1, wherein the RQs reside in a memory external to the network adapter, and wherein the circuitry is configured to manage the RQs logically by receiving from the cores a notification of the RQs allocated in the memory.

8. The network adapter according to claim 1, wherein the circuitry is configured to apply the distribution rule to multiple received messages for dynamically balancing a work load among the RQs.

9. A method, comprising:
in a network adapter, which comprises a network interface that is assigned a single network address in a communication network, receiving messages from one or more other nodes over the communication network, wherein the messages are destined for processing by multiple threads in one or more processing cores of the network node but are nevertheless addressed to the single network address, and wherein each message comprises a header field comprising an identifier of a process running on a remote node that sent the message;
holding a distribution rule for distributing the messages among multiple Receive Queues (RQs) that are accessible by the threads, wherein the distribution rule specifies a process-to-RQ mapping that maps one or more processes running on one or more remote nodes, by their respective identifiers, to each of the RQs;
receiving a multi-packet message via the network interface;
extracting from the header field of the received message a respective process identifier; and
selecting for the packets of the received message a respective RQ by mapping the extracted process identifier to the respective RQ using the process-to-RQ mapping.

10. The method according to claim 9, wherein receiving the messages comprises receiving the messages for performing at least a portion of a distributed application program using the threads.

11. The method according to claim 9, wherein the threads are assigned to handle messages of respective RQs in accordance with a predefined threads-to-RQ mapping, and wherein applying the distribution rule comprises selecting the respective RQ independently of the threads-to-RQ mapping.

12. The method according to claim 9, wherein each thread is assigned a single respective RQ, and wherein the method comprises notifying a given thread of a message added to the respective RQ.

13. The method according to claim 9, wherein applying the distribution rule comprises selecting a given RQ based on an occupancy status of multiple RQs including the given RQ.

14. The method according to claim 9, wherein applying the distribution rule comprises selecting a RQ for a given message depending on previous messages received via the network interface.

15. The method according to claim 9, wherein the RQs reside in a memory external to the network adapter, and comprising managing the RQs logically by receiving from the cores a notification of the RQs allocated in the external memory.

16. The method according to claim 9, and comprising applying the distribution rule to multiple received messages for dynamically balancing a work load among the RQs.

17. A network node, comprising:
one or more processing cores, which are configured to execute multiple threads; and
a network adapter, which is configured to:
connect to a communication network via a network interface, which is assigned a single network address in the communication network;
receive from one or more other nodes over the communication network, via the network interface, messages that are destined for processing by the multiple threads, but are nevertheless addressed to the single network address, wherein each message comprises a header field comprising an identifier of a process running on a remote node that sent the message;
hold a distribution rule for distributing the messages among multiple Receive Queues (RQs) that are accessible by the threads, wherein the distribution rule specifies a process-to-RQ mapping that maps one or more processes running on one or more remote nodes, by their respective identifiers, to each of the RQs;
receive a multi-packet message via the network interface;
extract from the header field of the received message a respective process identifier; and
select for the packets of the received message a respective RQ by mapping the extracted process identifier to the respective RQ using the process-to-RQ mapping.

18. A computing system, comprising multiple network nodes connected to a communication network, each network node comprising one or more processing cores for executing multiple threads, wherein the network nodes are configured to:
exchange messages with one another over the communication network for performing a distributed application; and
in a given network node:
receive from one or more other nodes over the communication network, via a network interface for which a single network address is assigned in the communication network, messages that are destined for processing by multiple threads of the given network node, but are nevertheless addressed to the single network address;
hold a distribution rule for distributing the messages among Receive Queues (RQs) that are accessible by the threads of the given network node, wherein the distribution rule specifies a process-to-RQ mapping that maps one or more processes running on one or more remote nodes, by their respective identifiers, to each of the RQs;
receive a multi-packet message via the network interface;
extract from the header field of the received message a respective process identifier;
select for the packets of the received message a respective RQ by mapping the extracted process identifier to the respective RQ using the process-to-RQ mapping; and
perform at least a portion of the distributed application using the threads.

* * * * *